UNITED STATES PATENT OFFICE.

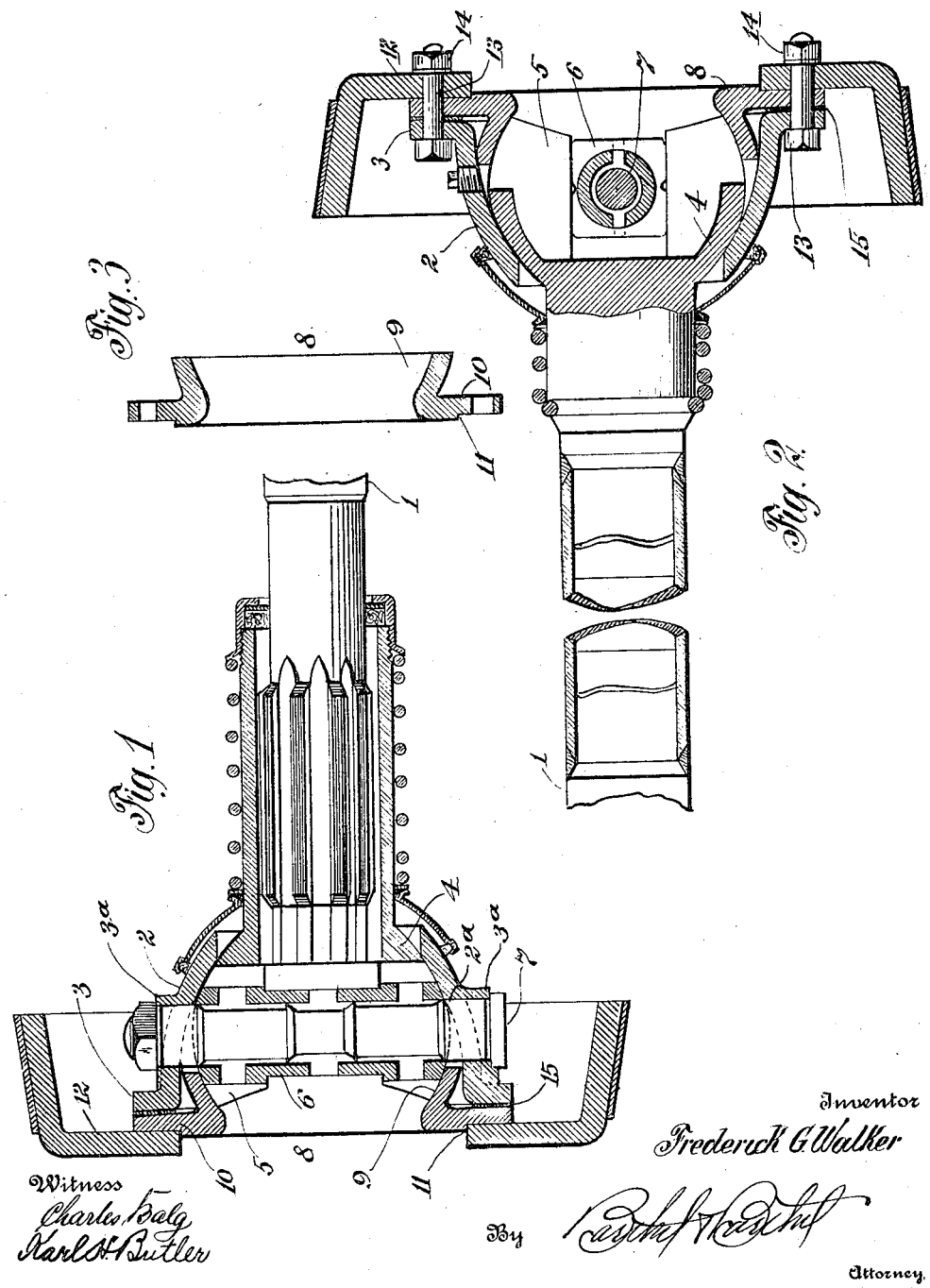

FREDERICK G. WALKER, OF DETROIT, MICHIGAN.

UNIVERSAL JOINT.

1,285,488.   Specification of Letters Patent.   Patented Nov. 19, 1918.

Application filed January 31, 1917. Serial No. 145,611.

*To all whom it may concern:*

Be it known that I, FREDERICK G. WALKER, a citizen of the United States of America, residing at Detroit, in the county of Wayne and State of Michigan, have invented certain new and useful Improvements in Universal Joints, of which the following is a specification, reference being had therein to the accompanying drawings.

This is an improvement in connection with that type of a universal joint disclosed by my Patent No. 1,181,625, granted May 2. 1916, and an application for patent filed May 31, 1916, Serial No. 100,771, and allowed Sept. 25, 1916. The universal joint disclosed by my patent and application includes a socket member, a ball member therein, a trunnion block in the ball member, a bolt carried by the socket member and extending through the trunnion block, and a ball retaining member in the socket member against the ball member. All of these parts are assembled to provide for a thorough lubrication and easy adjustment of the ball member relative to the socket member.

The present invention relates particularly to the ball retaining member and the socket member and my invention aims to provide a one piece ball retaining member that may be readily pressed from sheet steel, and easily and quickly installed, with a cone clutch, brake drum or companion flange.

My invention also aims to provide a pressed steel socket member such that trunnion bolt bosses may be welded or otherwise secured to said socket member, thus providing a member less expensive and equally as durable as a drop forged socket member.

My invention will be hereinafter described and reference will now be had to the drawing, wherein—

Figure 1 is a longitudinal sectional view of a universal joint relative to a drive shaft and a cone clutch;

Fig. 2 is a similar view of the universal joint taken at right angles to Fig. 1, and Fig. 3 is a sectional view of a ball retaining member.

In the drawing, 1 denotes a portion of a drive shaft having universal joints at the ends thereof, and each universal joint comprises a socket member 2 provided with a peripheral flange 3. This socket member is pressed and stamped from sheet steel and the side walls thereof are provided with apertures as at $2^a$. Bosses $3^a$ are then welded or otherwise secured to the outer walls of the socket member around the apertures $2^a$, so as to provide bearings for a trunnion pin or bolt to be hereinafter referred to. Seated in the socket member 2 is a ball member 4 connected to the end of the shaft 1 in the usual and well known manner. The ball member 4 is cut away and slotted to provide the usual bearings 5 for a trunnion block 6 and extending through said trunnion block is a bolt or pin 7 carried by the socket member 2. As shown, the trunnion block 6 is cut away to provide lubricant ports to the bolt or pin 7, which is also grooved or provided with reduced portions so that a lubricant may freely circulate in the universal joint and insure easy movement of the ball member 4 in the socket member 2.

Seated on the flange 3 of the socket member 2 is a ball retaining member generally designated 8 and this member is pressed from steel or other durable metal and comprises a skirt portion 9 and a peripheral flange 10. The skirt portion 9 is adapted to extend into the socket member 2 and engage the periphery of the ball member 4, to hold said ball member seated in the socket member. The flange 10 has the outer face thereof cut away to provide a seat 11, and said flange is adapted to be sandwiched between the flange 3 of the socket member 2 and a cone clutch 12, so that the universal joint can be connected to the cone clutch 12, with all parts assembled, by bolts 13 and nuts 14.

With the cone clutch 12 removed, the pressed steel ball retaining member 8 may be attached to the flange 3 so that the ball member 4 cannot become accidentally displaced relative to the socket member 2, thus maintaining the universal joint assembled ready for installation.

Shims 15 may be interposed between the flanges 3 and 10 and as wear occurs between the ball member 4 and the skirt 9, the shims, which are preferably of the laminated type, may be gradually removed to permit of the ball retaining member properly holding the ball member relative to the socket member.

I attach considerable importance to the fact that the ball retaining member is made of pressed steel and consequently can be manufactured at a comparatively small cost from available materal.

What I claim is:—

In a universal joint, a socket member having a peripheral flange, a ball member in said socket member, a ball retaining member bearing against said ball member within said socket member and having a peripheral flange engaging the flange of said socket member and provided with an annular seat, and a clutch member having a flat apertured wall on the seat of the flange of said ball retaining member and connected to the flange of said socket member, said clutch member having a peripheral wall of a sufficient depth to surround the greater part of said socket member.

In testimony whereof I affix my signature in the presence of two witnesses.

FREDERICK G. WALKER.

Witnesses:
KARL H. BUTLER,
ANNA M. DORR.

Copies of this patent may be obtained for five cents each, by addressing the "Commissioner of Patents, Washington, D. C."